United States Patent [19]

Schueller et al.

[11] Patent Number: 5,236,380
[45] Date of Patent: Aug. 17, 1993

[54] APPARATUS AND METHOD FOR PROVIDING OIL CIRCULATION IN A MARINE PROPULSION SYSTEM

[75] Inventors: Niel M. Schueller; Gary L. Meisenburg; Charles F. Gray, Jr., all of Fond du Lac, Wis.

[73] Assignee: Brunswick Corporation, Skokie, Ill.

[21] Appl. No.: 892,399

[22] Filed: May 28, 1992

Related U.S. Application Data

[63] Continuation of Ser. No. 525,767, May 18, 1990, abandoned.

[51] Int. Cl.$^5$ ............................................. B63H 21/36
[52] U.S. Cl. ......................................... 440/76; 440/88; 440/900
[58] Field of Search ................. 440/88, 75, 78, 900, 440/76

[56] References Cited

U.S. PATENT DOCUMENTS

| | | | |
|---|---|---|---|
| 3,931,783 | 1/1976 | Croisant | 440/75 |
| 4,764,135 | 8/1988 | McCormick | 440/88 |
| 4,948,384 | 8/1990 | Bland et al. | 440/78 |
| 4,950,190 | 8/1990 | Meisenburg | 440/88 |

Primary Examiner—Sherman Basinger
Assistant Examiner—Thomas J. Brahan
Attorney, Agent, or Firm—Andrus, Sceales, Starke & Sawall

[57] ABSTRACT

An apparatus and method for providing improved oil circulation in a marine propulsion system. A supply passage is formed in the gearcase, having its inlet in communication with a space located forwardly of the lower face of the driven gear located in the propeller shaft cavity. The supply passage communicates oil to a drive shaft housing supply passage, and communication between the drive shaft housing supply passage and the upper cavity formed in the drive shaft housing, within which are disposed the lower and upper gears and the input gear, is cut off. Oil flowing through the drive shaft housing supply passage is routed to the universal joint bearings, and temperature of oil at the universal joint bearings is significantly reduced. An improved top cover for placement on top of the drive shaft housing includes an inlet in the top cover for receiving circulating oil pumped by the upper driven gear, which is routed to a recess formed in the underside of the top cover for distribution throughout the upper area of the drive shaft housing. A return passage is formed in the drive shaft housing and the gearcase for routing oil back to the propeller shaft cavity.

26 Claims, 5 Drawing Sheets

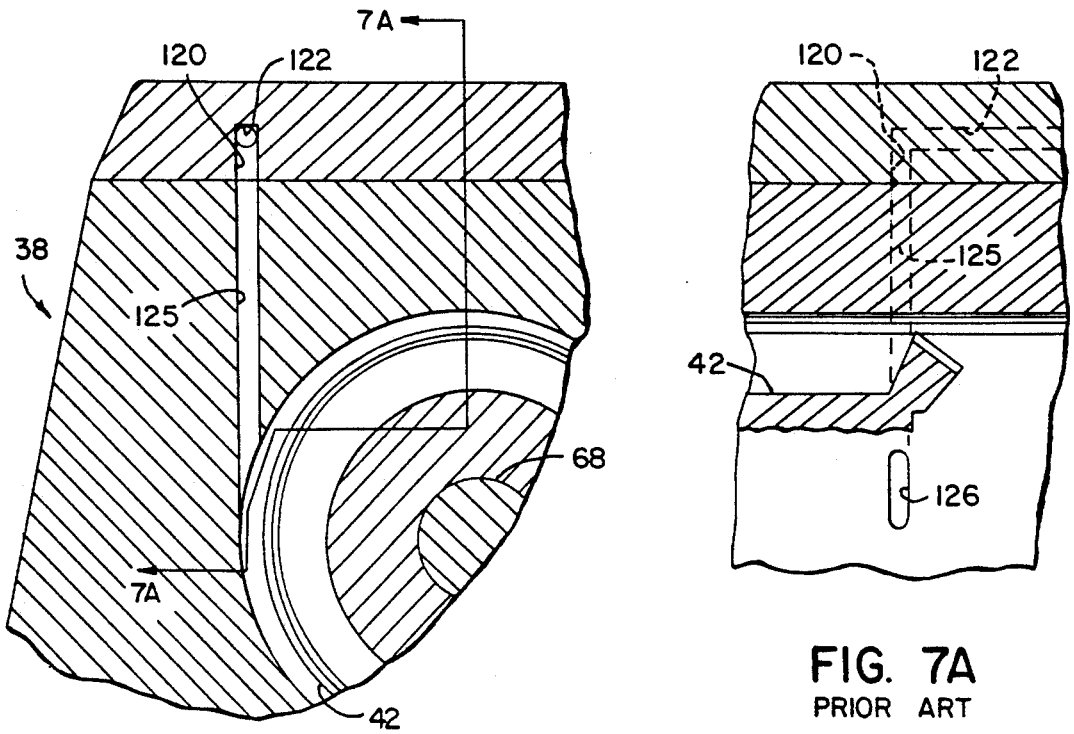
FIG. 7
PRIOR ART
FIG. 7A
PRIOR ART
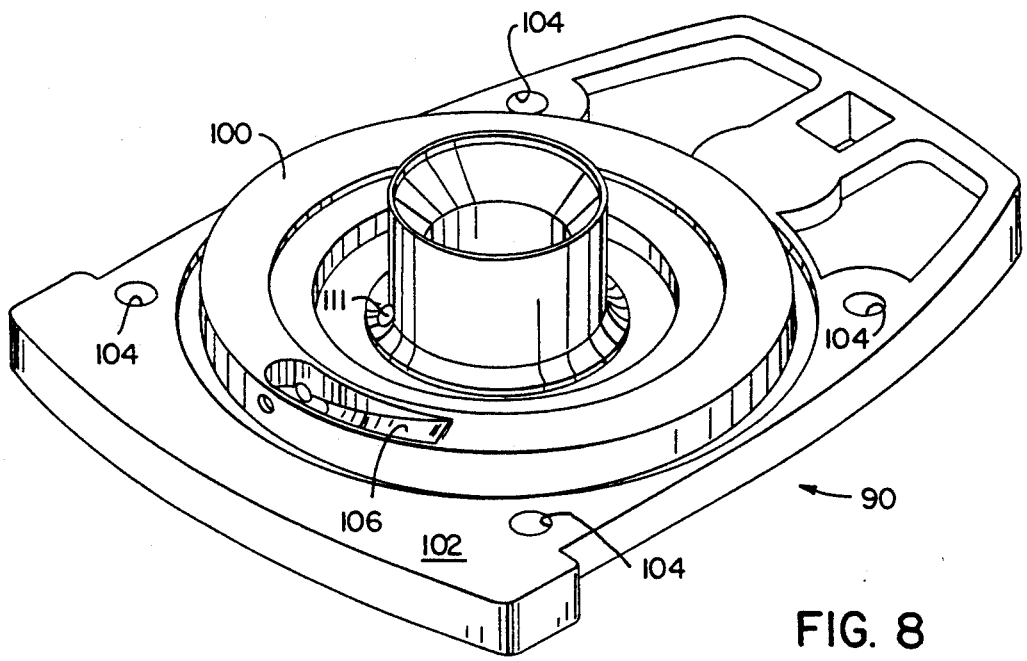
FIG. 8

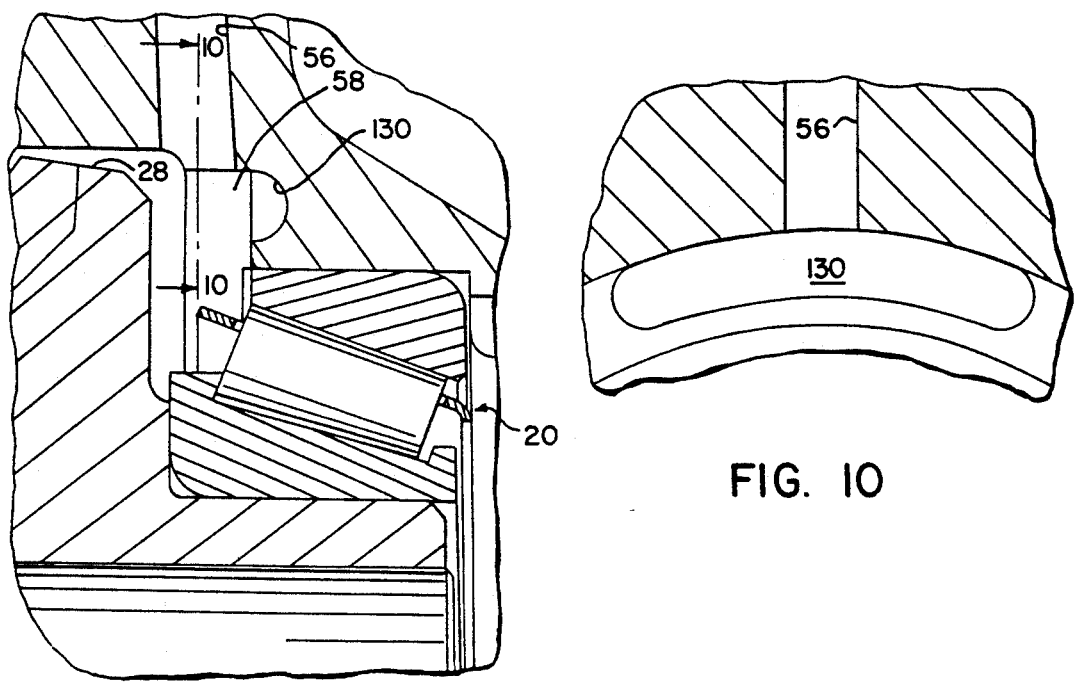
FIG. 9
FIG. 10
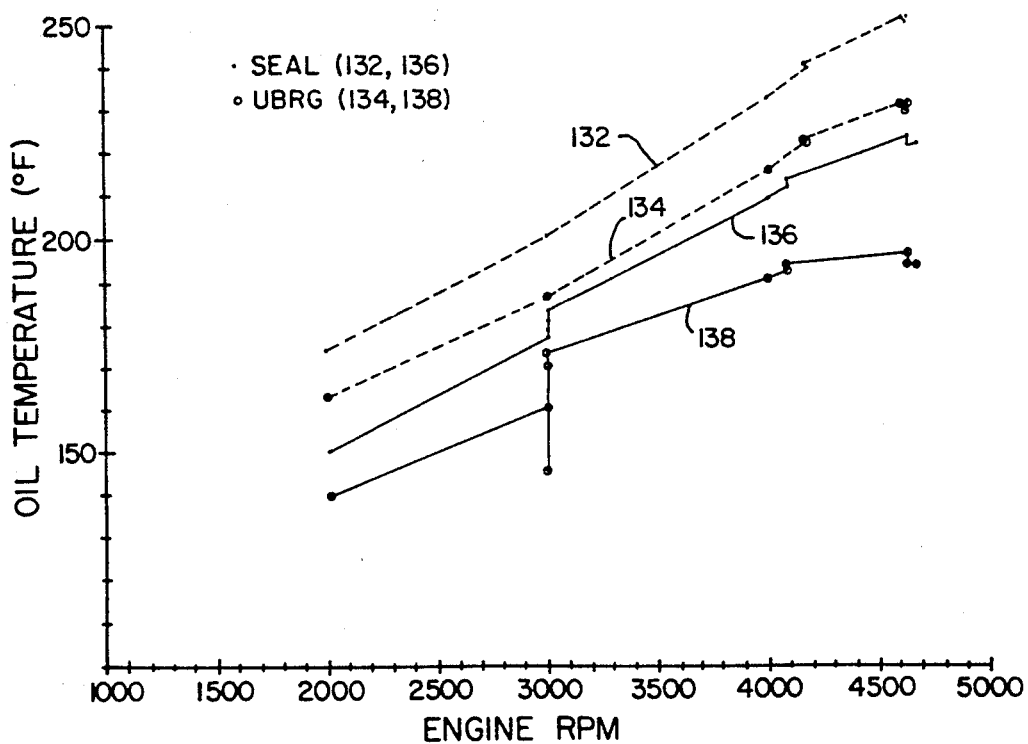
FIG. 11

APPARATUS AND METHOD FOR PROVIDING OIL CIRCULATION IN A MARINE PROPULSION SYSTEM

This application is a continuation of application Ser. No. 07/525,767, filed May 18, 1990, now abandoned.

BACKGROUND OF THE INVENTION

This invention relates to a marine propulsion system, and more particularly to an apparatus and method for improving circulation of lubricant such as oil through the gearcase and drive shaft housing of a stern drive system.

The outboard portion of a stern drive marine propulsion system is broadly defined by a drive shaft housing mounted for pivoting movement about a steering access to the transom of a boat, and a gearcase mounted to the lower end of the drive shaft housing. An input shaft is disposed within an upper cavity provided in the drive shaft housing, and is driven through a universal joint by an inboard mounted internal combustion engine. A bearing assembly is provided in the upper cavity for the input shaft, with the bearings being located adjacent the universal joint.

The input shaft is provided with a drive gear which meshes with forward and reverse gears mounted in the drive shaft housing upper cavity for free rotation about the drive shaft. A clutch assembly is provided on the drive shaft between the forward and reverse gears for selectively coupling the drive shaft to one or the other of such gears. The drive shaft extends downwardly through the drive shaft housing and the gearcase, and is connected at its lower end to a drive gear engaged with a driven gear provided on a propeller shaft, which are disposed in a propeller shaft cavity located in the lower portion of the gearcase.

A top cover is adapted for placement on top of the drive shaft housing, and defines in part the upper wall of the upper cavity in which the input shaft drive gear and the forward and reverse gears are located.

The present invention has as its object to improve oil circulation through the internal cavities and passages provided in the gearcase and the drive shaft housing, and particularly to provide a system in which oil is circulated from the lower portion of the gearcase, which is submerged in the water and cooled during operation, to the upper portion of the drive shaft housing, particularly to the components located in the upper cavity formed therein. Oil from the drive shaft housing upper cavity is circulated down to the gearcase propeller shaft cavity, for cooling the oil prior to its recirculation back up into the drive shaft housing upper cavity. In accomplishing this object of the invention, the life of the universal joint bearing and other components in the drive shaft housing upper cavity is extended due to the supply of cooled oil resulting in reduced operating temperatures.

The invention comprises lubricant circulation means adapted for employment in a marine propulsion system, which may be such as described previously, comprising a housing, an upper input shaft located within a cavity formed in the housing, a drive member mounted to the input shaft, a lower propeller shaft disposed within a propeller shaft cavity, a driven member mounted to the propeller shaft, and drive means extending between the drive member and the driven member for imparting rotation to the propeller shaft in response to rotation of the input shaft. The lubricant circulation means comprises a first supply passage providing communication between the propeller shaft in cavity and the input shaft cavity, including an inlet in the propeller shaft cavity located adjacent the driven member. Rotation of the driven member stimulates a pump-like action on the lubricant to supply lubricant under pressure to the inlet of the first supply passage, with the lubricant flowing therethrough to the input shaft cavity. A return passage communicates between the input shaft cavity and the propeller shaft cavity for providing return flow of lubricant from the input shaft cavity to the propeller shaft cavity. In a system employing a drive shaft having a drive gear at its lower end engaged with a driven gear provided on the propeller shaft, the inlet to the first supply passage is preferably in communication with a space disposed between the forwardmost surface of the driven gear and a rearwardly facing inner surface associated with the propeller shaft cavity, with the lubricant in the space being provided with positive pressure upon rotation of the driven gear. The first supply passage preferably provides unrestricted flow of lubricant from the inlet to a drive shaft housing supply passage, which is in communication with the drive shaft housing upper cavity. In a preferred form of the invention, a bearing supply passage is formed in the drive shaft housing having its inlet in communication with the drive shaft housing supply passage and its outlet disposed adjacent the universal joint. A plug or the like is adapted for placement toward the upper end of the drive shaft housing supply passage, for cutting off communication between the drive shaft housing supply passage and the drive shaft housing upper cavity. In this manner, lubricant pumped through the first supply passage to the drive shaft housing supply passage is directed through the bearing supply passage to the universal joint bearings, where the lubricant first enters the drive shaft housing upper cavity. From the universal joint bearings, the lubricant is supplied to the mesh of the input gear with the forward and reverse gears, and is circularly swirled and pumped by the spinning forward and reverse gears within the portion of the drive shaft housing upper cavity in which such gears are located. A main return passage has its inlet in communication with the drive shaft housing upper cavity, and its outlet in communication with a drive shaft housing return cavity, which provides return flow of lubricant between the drive shaft housing upper cavity and the propeller shaft cavity formed in the lower end of the gearcase.

In accordance with another aspect of the invention, a method of improving lubricant circulation in a marine propulsion system is provided, substantially in accordance with the foregoing description.

In accordance with yet another aspect of the invention, the top cover, which is adapted for placement at the upper end of the drive shaft housing, and defines in part the upper wall of the drive shaft housing upper cavity, is provided with a lubricant inlet in communication with the drive shaft housing upper cavity. A passage extends between the inlet and a recess formed in the lower surface of the top cover, with the recess being adapted to receive the upper end of the drive shaft. In this manner, upon rotation of the uppermost of the upper and lower gears and the pinion by the input shaft lubricant in the upper drive shaft housing cavity is provided under pressure to the inlet of the passage formed in the top cover for supply to the recess, which routes lubricant to the bearings adjacent the upper end of the drive shaft.

In accordance with yet another aspect of the invention, a method of improving oil circulation in the upper cavity of the gearcase comprises providing a top cover substantially in accordance with the foregoing description.

These and other aspects and objects of the invention will be made apparent from the following description taken together with the drawings.

BRIEF DESCRIPTION OF THE DRAWINGS

The drawings illustrate the best mode presently contemplated of carrying out the invention.

In the drawings:

FIG. 7 is a partial sectional view showing the upper end of a prior art drive shaft housing and top cover, reference being made to line 7—7 of FIG. 3;

FIG. 7A is a partial sectional view taken generally along line 7A—7A of FIG. 7;

FIG. 8 is an isometric view showing the bottom surface of the top cover of the invention;

FIG. 9 is an enlarged partial sectional view showing the thrust bearing provided at the forward end of the propeller shaft cavity and the forwardmost surface of the driven gear provided on the propeller shaft, with a modified construction in the propeller shaft cavity for facilitating flow of lubricant into the inlet of the first supply passage;

FIG. 10 is a partial sectional view taken generally along line 10—10 of FIG. 9;

FIG. 11 is a graphic representation showing differential in oil temperature at two different locations resulting from the oil circulation system of the invention.

DETAILED DESCRIPTION

Figure 1:
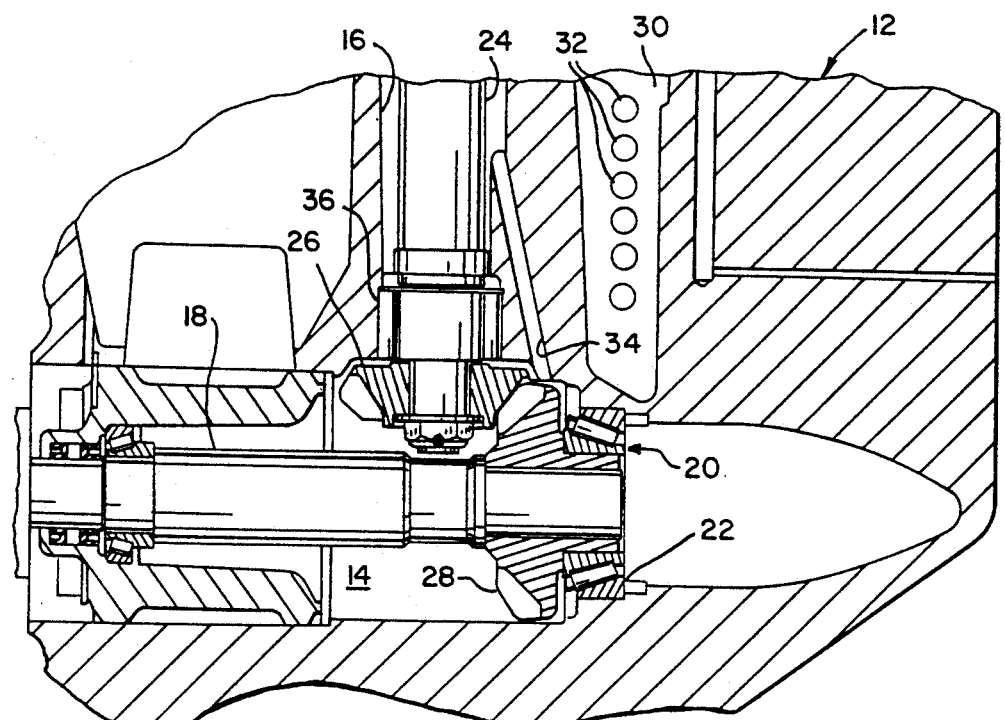
FIG. 1 is a partial sectional view of the lower portion of the gearcase in which the propeller shaft cavity is formed, showing a prior art structure for routing oil from the propeller shaft cavity.

FIG. 1 illustrates the lower portion of a gearcase, shown at 12, of a stern drive marine propulsion system. Gearcase 12 is constructed as is conventional in the prior art, including a propeller shaft cavity 14 formed toward its lower end, and a drive shaft cavity 16 extending upwardly from propeller shaft cavity 14. A propeller shaft 18 is rotatably supported within propeller shaft cavity 14, and a thrust bearing assembly 20 supports the forward end of propeller shaft 18. Thrust bearing assembly 20 includes an outer race 22 which is adapted to be received within a shoulder area formed in gearcase 12 toward the forward end of propeller shaft cavity 14.

A drive shaft 24 extends downwardly through gearcase 12 within drive shaft cavity 16, and a drive gear 26 is fixed to the lower end of drive shaft 24. Drive gear 26 meshes with a driven gear 28 mounted to the forward end of propeller shaft 18. In this manner, rotation of drive shaft 24 is imparted to propeller shaft 18 through drive gear 26 and driven gear 28.

A cooling water passage 30 is formed in drive shaft housing 12, and receives cooling water through a series of inlets, shown at 32. The cooling water in passage 30 is supplied to a water pump for circulating the cooling water through the engine cooling system, as is known.

A slanted passage 34 is formed in gearcase 12, having its inlet adjacent to and facing the upper forwardmost area of meshing between drive gear 26 and driven gear 28. The outlet of passage 34 is in communication with drive shaft cavity 16.

Passage 34 exists for allowing oil located in propeller shaft cavity 14 to circulate upwardly into drive shaft cavity 16. However, it has been found that the inlet to passage 34 is in an area where very little fluid pressure exists during rotation of drive gear 26 and driven gear 28, and very little fluid passes through passage 34 into drive shaft cavity 16. Any oil which does pass through passage 34 and into drive shaft cavity 16 is circulated downwardly back into propeller shaft cavity 14 through a needle bearing assembly 36 located toward the lower end of drive shaft 24.

Figure 2:
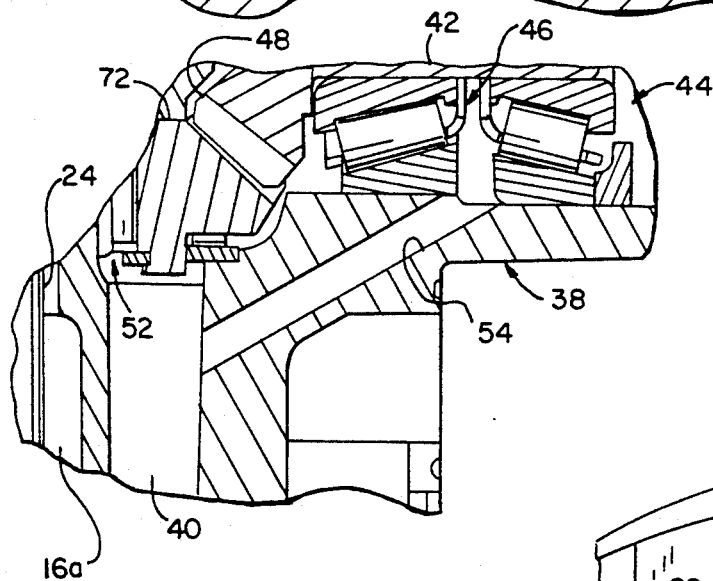
FIG. 2 is a partial sectional view showing the lower portion of the universal joint bearings and a prior art structure for routing oil thereto.

Referring to FIG. 2, a portion of a drive shaft housing 38 is illustrated. Drive shaft housing 38 is mounted onto the upper end of gearcase 12, in a manner as is known. Also shown in FIG. 2 are the upper end of drive shaft 24 as contained within a drive shaft cavity 16a formed in drive shaft housing 38.

A lubricant passage, shown at 40, is formed in drive shaft housing 38. The upper end of passage 40 is in communication with an upper cavity formed in drive shaft housing 38. The upper cavity of drive shaft housing 38 houses a number of components, as will be explained, including an input gear 42 rotatably supported by a pair of bearing assemblies 44, 46. A series of teeth 48 are formed at the forward end of input gear 42. An upper gear 50 is also mounted within the upper cavity of drive shaft housing 38, and is rotatably supported about the upper end of drive shaft 24 by means of a bearing assembly 52.

A slanted passage 54 is formed in gearcase 38, and extends from the upper end of passage 40 to its outlet, which is in communication with the upper cavity formed in drive shaft housing 38 between bearing assemblies 44, 46.

Figure 3:
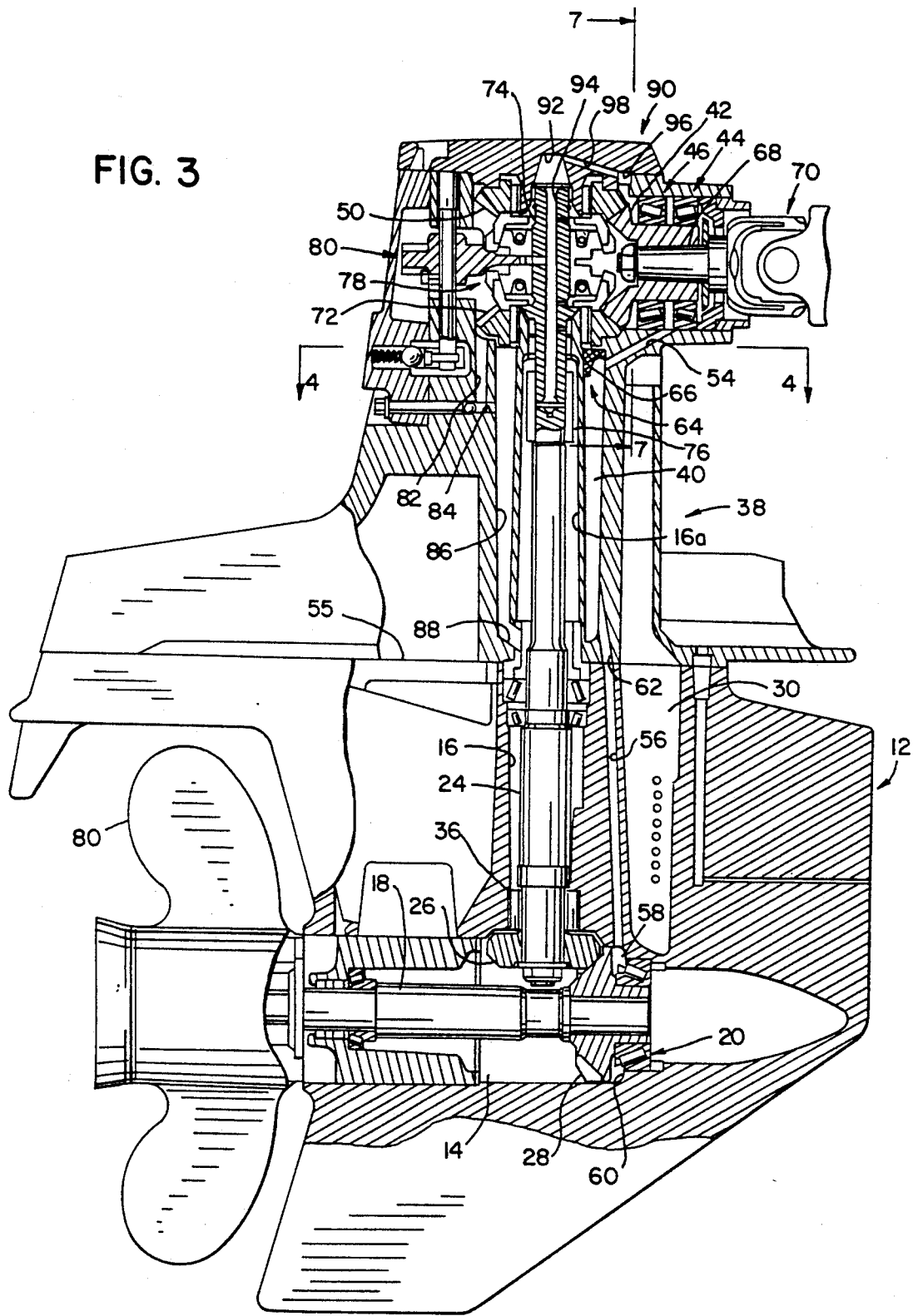
FIG. 3 is a side elevation view, with portions broken away, of a stern drive marine propulsion system incorporating the oil circulation system of the invention.

Reference is now made to FIG. 3 for an explanation of the structure and operation of the oil circulation system of the present invention. Like reference characters will be used where possible to facilitate clarity.

As shown in FIG. 3, a joint 55 is formed between the lower end of drive shaft housing 38 and the upper end of gearcase 12. Gearcase 12 and drive shaft housing 38 fit together to form the external components of the stern drive marine propulsion system.

A lubricant supply passage 56 is formed in gearcase 12, and the lower portion of passage 56 is oriented at an angle of approximately 3° off vertical. The inlet to passage 56 is in communication with a space 58 provided at the forward end of propeller shaft cavity 14 between its annular end wall 60 and the forwardly facing flat end surface of driven gear 28. It has been found that this location of the inlet of passage 56 is provided with lubricant under positive pressure of approximately 2 to 3 PSI upon rotation of drive gear 26 and driven gear 28, with engine speed of approximately 3,000 rpm.

Passage 56 terminates in the upper surface of gearcase 12. A passage 62 is formed in drive shaft housing 38, having its inlet in communication with the outlet of gearcase passage 56, and its outlet in communication with passage 40 formed in drive shaft housing 38.

Figure 4:
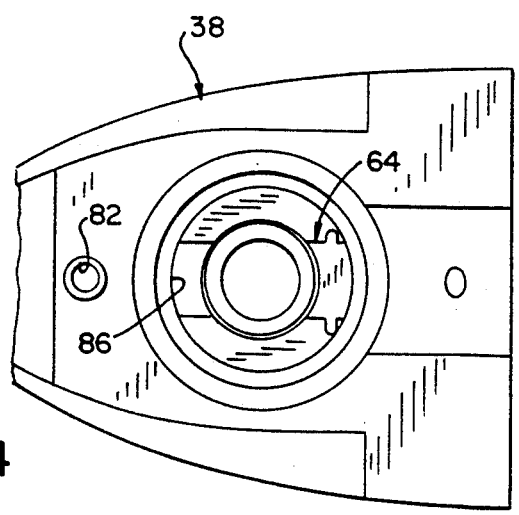
FIG. 4 is a section view taken generally along line 4—4 of FIG. 3.

A plug 64 (FIGS. 3,4) is placed in the upper end of passage 40 so as to cut off communication between passage 40 and the upper cavity of drive shaft housing 38. Plug 64 is provided with an arcuate wall 66, which terminates at its right side above the uppermost point of the inlet of bearing supply passage 54, so as to allow full communication between passage 40 and bearing supply passage 54.

The cavity formed in the upper portion of drive shaft housing 38 houses input gear 42, which is connected to an input shaft 68 mounted through a universal joint 70 to the output shaft of an inboard-mounted internal combustion engine (not shown). As noted previously, input gear 42 is mounted within bearing assemblies 44, 46, for accommodating rotation thereof. As also noted previously, input gear 42 meshes with upper gear 50 and a lower gear, shown at 72, both of which are supported for free rotation by needle bearing assemblies, about an upper drive shaft portion 74.

Upper drive shaft portion 74 is provided at its lower end with external splines, and lower drive shaft portion 24 is provided at its upper end with external splines. The external splines on upper drive shaft portion 74 and lower drive shaft portion 24 are received within an internally splined collar 76, which acts to secure upper and lower drive shaft portions 74, 24 together.

A slidable clutch assembly 78 is mounted to a series of external splines provided on upper drive shaft portion 74, and a clutch actuator mechanism 80 is provided for selectively coupling either lower gear 72 or upper gear 50 to upper drive shaft portion 74. In this manner, the desired direction of rotation is imparted to lower drive shaft portion 24, and thereby through gears 26, 28 to propeller shaft 18 and to a propeller 80 connected thereto.

A return passage 82 is in communication with the upper cavity formed in drive shaft housing 38 toward its rearward end, and communicates through a horizontal passage 84 with a vertical return passage 86. Return passage 86 has its lower discharge outlet in communication with drive shaft cavity 16a through a slanted passage 88.

In operation, the above-described structure functions as follows. Upon rotation of driven gear 28 connected to propeller shaft 18, oil within space 58 is stimulated to create a pump-like action so as to be supplied under positive pressure to the inlet of supply passage 56. Such oil then passes through passage 62 to drive shaft housing supply passage 40. The presence of plug 64 prevents oil passing upwardly through drive shaft housing supply passage 40 to pass directly vertically into the upper cavity formed in drive shaft housing 38. Instead, the oil is directed by means of arcuate wall 66 into bearing supply passage 54, for discharge between universal joint bearings 44, 46. Oil supplied thereto lubricates bearings 44, 46, and from bearings 44, 46 is supplied to the area of meshing between input gear 42 and lower and upper gears 72, 50. The oil is then slung around inside the upper cavity formed in drive shaft housing 38 by rotation of lower and upper gears 72, 50. A portion of the oil within the upper cavity in drive shaft housing 38 is discharged therefrom into the upper inlet of return passage 82, which then passes through passage 84 and into main return passage 86. Additionally, oil is supplied to main passage 86 through the inlet in its upper end, below upper gear 50. The oil so supplied to passage 86 passes through its discharge passage 88 into drive shaft cavity 16a, and is supplied to the roller bearings immediately therebelow. Such oil then continues its travel downwardly through drive shaft cavity 16 formed in gearcase 12, through needle bearing assembly 36 and back into propeller shaft cavity 14.

Under some operating conditions, it has been found that, at the lower end of drive shaft cavity 16 and upon rotation of drive gear 26, a slightly negative pressure exists which sucks the oil downwardly through drive shaft cavity 16 and into propeller shaft cavity 14 for recirculation.

The upper wall of the upper cavity formed in drive shaft housing 38 is defined by the lower wall of a top cover 90 which is adapted for placement on top of drive shaft housing 38. Top cover 90 includes a substantially central recess 92, which is adapted to receive a needle bearing assembly provided on the upper end of upper drive shaft portion 74 so as to accommodate rotation of the drive shaft. Upper drive shaft portion 74 includes a central vertical passage 94, and a series of small diameter branch passages extend outwardly from passage 94 to the outer surface of upper drive shaft portion 74.

As a means for facilitating flow of lubricant to recess 92, and thereby to the upper bearings in which the upper end of drive shaft portion 74 is received, and to drive shaft passage 94, an inlet pocket 96 is formed in the underside of top cover 90, and a passage 98 extends between pocket 96 and recess 92. This aspect of the invention is more clearly shown in FIGS. 5-7.

Figure 5:
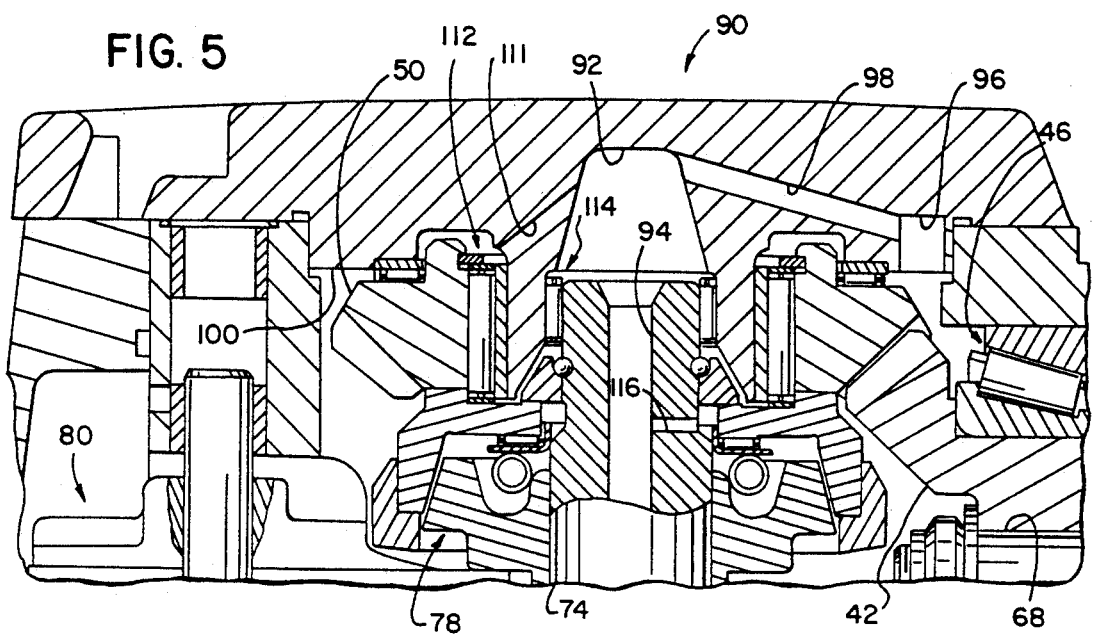
FIG. 5 is an enlarged partial sectional view showing the upper end of the stern drive system shown in FIG. 3, detailing the positioning of the top cover on the upper end of the drive shaft housing adjacent the upper cavity formed therein.

As shown in FIG. 5, when top cover 90 is in position on the upper end of drive shaft housing 38, pocket 96 faces downwardly and opens at its lowermost surface into the upper cavity formed in drive shaft housing 38, which houses input gear 42 and lower and upper gears 72, 50. The entrance to pocket 96 is located above the area at which input gear 42 meshes with lower gear 72.

Figure 6:
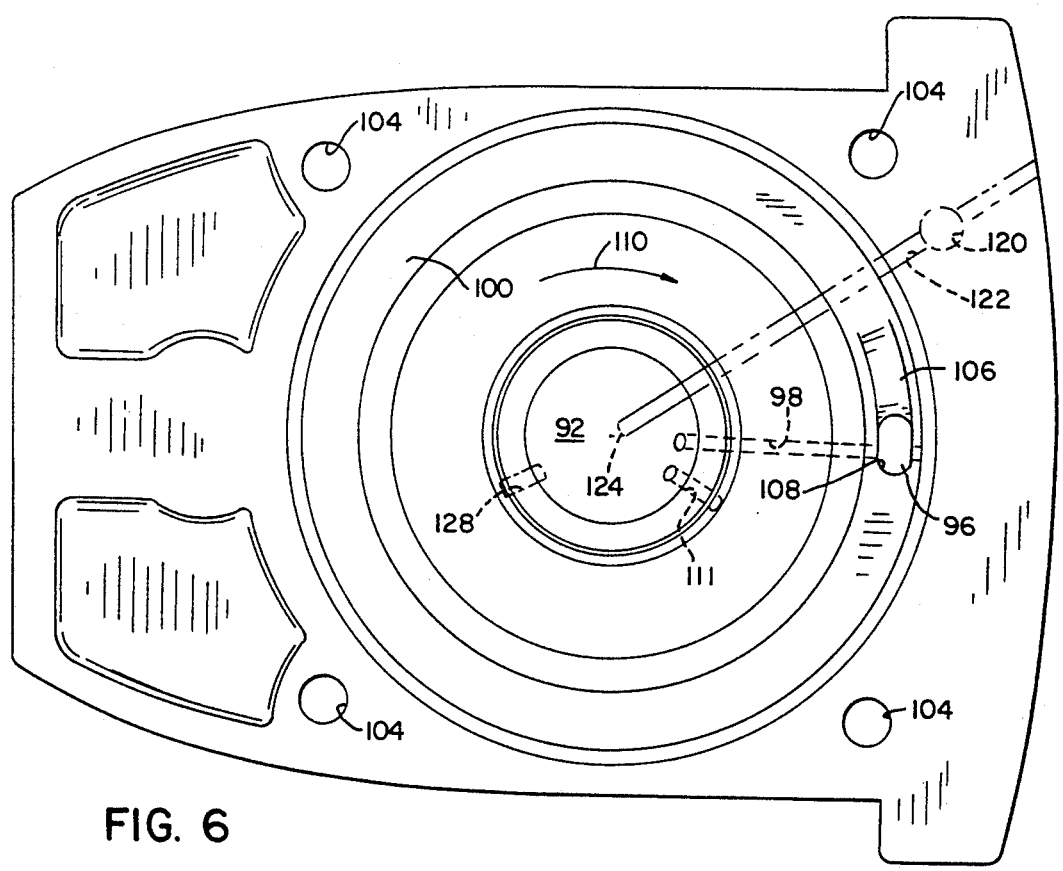
FIG. 6 is a bottom plan view of the top cover of FIG. 5, with the prior art passages shown in phantom.

As shown in FIGS. 6 and 8, pocket 96 is formed in an annular surface 100, which projects below a surface 102, which is adapted to be engaged with the upper surface of drive shaft housing 38. A series of openings 104 are formed in top cover 90, and are adapted to receive threaded fasteners for securing top cover 90 to drive shaft housing 38.

A ramped entryway 106 extends between pocket 96 and surface 100, providing a gradual transition between surface 100 and the uppermost extent of pocket 96. Entryway 106 is arcuate in plan view, having a radius corresponding to that of surface 100, and extends from pocket 96 in a direction away from the end wall of pocket 96, shown at 108. The ramped entryway into pocket 96 features a smooth radiused transition from surface 100 to pocket 96. This transition shape uses well known fluid adhesion principles to enhance the flow of oil into pocket 96 and passage 98.

As shown in FIGS. 5, 6 and 8, passage 98 extends from pocket 96 adjacent end wall 108 into the interior of recess 92. A passage 111 extends through the annular depending cup-like projection which forms recess 92, discharging into the upper portion of the upper cavity in drive shaft housing 38 adjacent a needle bearing assembly 112, which supports lower gear 72 for rotation about the cup-like member. In this manner, a portion of the oil supplied to recess 92 through passage 98 is channeled through passage 111 to lubricate needle bearing assembly 112 and the other components located in the upper portion of the upper cavity in drive shaft housing 38. The remainder of the oil in recess 92 passes through the lower end of recess 92 into passage 94 formed in upper drive shaft portion 74, and to the needle bearing assembly, shown at 114, which supports the upper end of upper drive shaft portion 74. The branch passages extending between central passage 94 and the exterior of upper drive shaft portion 72, such as shown at 116, provide lubricant to the outer surface of upper drive shaft portion 74 at various locations along its length. The oil in the upper cavity formed in drive shaft housing 38 then makes its way to return passages 82, 86 for ultimate recirculation back through the oil circulation system, as described previously, and/or through passage 16a (FIG. 3).

Referring to FIGS. 6, 7 and 7A, in a prior art construction of top cover 90 a supply passage, shown in phantom at 120, is formed in surface 102. A cross-passage 122 opens onto the exterior surface of the top cover end wall, and extends inwardly to a discharge 124 in recess 92. A plug is placed in the portion of passage 122 extending between supply passage 120 and the exterior surface of top cover 90, for preventing passage of oil exteriorly of the top cover. Supply passage 120 is in communication with a drive shaft housing supply passage, shown in FIG. 7A at 125. Passage 125 extends downwardly through drive shaft housing 38, opening into the upper cavity formed in drive shaft housing 38 adjacent input gear 42 connected to input shaft 68. Referring to FIG. 7A, the inlet to drive shaft housing supply passage 125, shown at 126, is located at approximately a 9:00 position relative to input gear 42, and is oriented slightly forwardly of the toothed portion of input gear 42. In this manner, oil within the upper cavity of drive shaft housing 38 is supplied through inlet 126 to passage 125, and thereby through passage 122 to recess 92. A passage 128 (FIG. 6) supplies oil from recess 92 to the exterior of the cup-like member formed in the underside of top cover 90.

Construction of top cover 90 as shown in FIG. 8 eliminates the need to form passage 124 in drive shaft housing 38, and also simplifies formation of the cross passage which communicates with recess 92. Rather than forming a passage extending from an outer surface of top cover 90 to communicate with the upper end of a supply passage and carry oil therefrom to recess 92, creating the necessity to plug the portion of the passage between the outer surface and the supply passage, passage 98 is formed at an angle to the horizontal, extending between recess 92 and the outer wall forming projecting surface 100. There is thus no need to plug any portions of passage 98 outwardly of pocket 96. This results in simplified construction of both drive shaft housing 38 and top cover 90.

Referring to FIG. 9, the lower end of propeller shaft cavity 14 is modified and an indentation 130 faces rearwardly in communication with space 58. Indentation 130 is arcuate in elevation, as shown in FIG. 10, extending an equal distance n either side of the inlet to passage 56. It has been found that indentation 130 increases the available pressure for pumping oil upwardly into passage 56. Providing a portion of indentation 130 on either side of the entrance to passage 56 facilitates oil flow into passge 56 upon either clockwise or counterclockwise rotation of driven gear 28.

It is anticipated that other modifications could be made to the portion of gearcase 12 forming propeller shaft cavity 14 for facilitating flow of oil into passage 56. However, it has been found that the construction as shown in FIG. 3 provides satisfactory pressure to the inlet of passage 56 with no modification to the structure of gearcase 12 at its lower end adjacent driven gear 28.

FIG. 11 illustrates a reduction in operating oil temperature after the oil circulation system of the invention, as shown and described, has been installed in a stern drive system.

Dashed line 132 shows oil temperature at the seal adjacent to the forward U-joint bearing 44, plotted against engine rpm. Dashed line 134 represents oil temperature at a location adjacent universal joint bearings 44, 46, plotted against engine rpm. Solid line 136 shows oil temperature at the seal adjacent to the forward U-joint bearing 44, after the oil circulation system of the invention is installed, and line 138 shows oil temperature at the universal joint bearings after installation of the oil circulation system of the invetnion. As can be seen, significant reductions in operating temperatures are attained with the circulation system in place. For example, at 2,000 rpm, the oil temperature at the universal joint bearing is approximately 180° without the system of the invention in place. With the oil circulation system of the invention in place, oil temperature at the universal joint bearing is less than 120°, a 33% reduction. A reduction in oil temperature of similar proportion is found throughout the range of rpm tested. This reduction in oil temperature is provided by the repeated cycling of the oil from the propeller shaft cavity, which is submerged during operation and cooled by the water, up into the upper portion of the gearcase and then back down again into the propeller shaft cavity. Additionally, the location of passages 56, 62 and 40 adjacent the cooling water intake passge maintains the material of gearcase 12 and drive shaft housing 38 adjacent such passages at a low temperature. This provides an added feature for cooling the circulating oil.

It has been found that a complete exchange of the total volume of oil within the gearcase and drive shaft housing occurs every 1 TM to 3 minutes, providing the substantial cooling effect illustrated in FIG. 11. The reduction in operating temperature, at critical locations such as the universal joint bearings, provides longer life to such bearings and also to the other components which are exposed to the circulating lubricant.

Various alternatives and embodiments are contemplated as being within the scope of the following claims particularly pointing out and distinctly claiming the subject matter regarded as the invention.

We claim:
1. A marine propulsion system, comprising:
  a drive shaft housing including an upper cavity;
  a depending gearcase connected to said drive shaft housing and including a lower cavity defined at least in part by an end wall;
  a drive shaft rotatably mounted within an extending through said gearcase and said drive shaft housing;
  an input shaft drivingly engaged with said drive shaft for imparting rotation to said drive shaft through a cooperating upper gear arrangement disposed within said drive shaft housing upper cavity;
  an axially extending propeller shaft rotatably mounted within said gearcase lower cavity;

a cooperating gear arrangement interposed between the drive shaft and the propelled shaft for imparting rotation to the propeller shaft, comprising a dive gear mounted to the drive shaft and a driven gear mounted to the propeller shaft and located within the lower cavity, the drive gear and the driven gear being engaged with each other, and wherein the driven gear is located within the gearcase lower cavity so as to be axially spaced from the end wall of said lower cavity to define a space therebetween;

a quantity of lubricant provided within said gearcase, drive shaft housing and lower cavity;

a lubricant supply passage having an inlet opening into the space located between said lower cavity end wall and said driven gear, wherein rotation of said driven gear provides lubricant under pressure to said space and to said supply passage inlet, said passage further having an outlet opening into said drive shaft housing upper cavity for supplying lubricant to said cooperating upper gear arrangement; and a lubricant return passage communicating between said upper cavity and said gearcase lower cavity for providing return flow of lubricant to said lower cavity.

2. The system of claim 1, wherein said supply passage includes a gearcase supply passage provided in said gearcase for supplying lubricant to a drive shaft housing supply passage provided in said drive shaft housing, said drive shaft housing supply passage opening into said upper cavity.

3. The system of claim 2, further comprising bearing means provided in said drive shaft housing upper cavity for rotatably supporting said input shaft, and wherein said lubricant is routed to said bearing means by a bearing supply passage communicating between said drive shaft housing supply passage and a bearing supply passage discharge disposed adjacent said bearing means.

4. The system of claim 3, further comprising means routing substantially all lubricant supplied to said drive shaft housing supply passage to said bearing means through said bearing supply passage.

5. The system of claim 4, wherein said bearing supply passage provides communication between said drive shaft housing supply passage and said bearing means independent of communication between said drive shaft housing supply passage and said upper cavity, and wherein said means routing substantially all lubricant to said bearing means comprises a plug adapted for placement in said drive shaft housing supply passage toward its upper end which cuts off communication between said drive shaft supply passage and said upper cavity while allowing lubricant to pass freely from said drive shaft housing supply passage into said bearing supply passage.

6. The system of claim 5, wherein a surface of said plug is disposed adjacent the inlet to said bearing supply passage, and is provided with a curved profile facilitating flow of lubricant from said drive shaft housing supply passage to said bearing supply passge.

7. The system of claim 1, wherein said driven gear is disposed toward the forward end of said lower cavity, and wherein said supply passge inlet is spaced forwardly of the forwardmost surface of said driven gear.

8. The system of claim 7, further comprising a recess formed in said lower cavity end wall, with the inlet to said supply passage being disposed in said recess.

9. The system of claim 1, further comprising a top cover adapted for placement at the upper end of said drive shaft housing, and wherein said top cover includes a passage having an inlet disposed adjacent said cooperating upper gears when said top cover is in place on said drive shaft housing and an outlet for supplying lubricant toward the upper end of said drive shaft.

10. The system of claim 9, wherein said top cover passage outlet is in communication with a cavity formed in said top cover, said cavity being adapted to receive the upper end of said drive shaft.

11. The system of claim 9, further comprising a vertical ramped recess provided in said top cover adjacent said cooperating upper gears, with the inlet of said top cover passage being disposed in said ramped recess, to enhance oil flow into said recess by fluid adhesion.

12. The system of claim 11, wherein said ramped recess terminates in an inner wall and the inlet of said top cover passage means is disposed adjacent said inner wall, with said ramped recess extending laterally from said inner wall so as to accommodate flow of lubricant into said ramped recess upon rotation of said cooperating upper gears, to facilitate supply of lubricant through said top cover passage means.

13. A marine propulsion system, comprising:
a housing including an upper cavity and a lower cavity defined at least in part by an end wall;
an upper input shaft adapted to be rotatably driven by an engine and being disposed within said housing upper cavity;
an input drive member mounted dot said input shaft;
a lower propeller shaft disposed within said housing lower cavity;
a driven member mounted to said propeller shaft and located within said housing lower cavity so as to be axially spaced from said lower cavity end wall to define a space therebetween;
drive means disposed between said drive member and said driven member and imparting rotation to said propeller shaft in response to rotation of said input shaft;
a quantity of lubricant provided in said housing;
a lubricant supply passage providing communication between said lower cavity and said input shaft cavity, and including an inlet in said housing lower cavity opening into the space located between said lower cavity end wall and said driven member, so that rotation of said driven member supplies lubricant under pressure to said space and to the inlet of said supply passage, with the lubricant flowing therethrough to said input shaft cavity; and
a return passage communicating between said input shaft cavity and said lower cavity for providing return flow of lubricant from said input shaft cavity to said lower cavity.

14. The system of claim 13, further comprising input shaft bearing means provided in said housing upper cavity, and wherein said supply passage has its outlet disposed adjacent said input shaft bearing means for providing lubricant thereto.

15. The system of claim 13, further comprising a forwardly extending recess formed in said end wall, with said supply passage inlet being in communication with said recess.

16. A method of improving circulation of lubricant in a marine propulsion system including a drive shaft housing and a depending gearcase, a drive shaft extending through said gearcase and said drive shaft housing, said drive shaft being driven toward tis upper end by an input shaft through cooperating upper gears provided on said drive shaft and said input shaft, said drive shaft housing including an upper cavity within which said upper gears are located, said drive shaft having toward its lower end a rive gear engaging a driven member disposed within a lower cavity formed in said gearcase, said gearcase lower cavity being defined at least in part by an end wall, said driven member being mounted to a propeller shaft located within said gearcase lower cavity, and wherein a quantity of lubricant is provided within said gearcase, drive shaft housing and lower cavity, comprising the steps of:

locating said driven member within said gearcase lower cavity such that a space is defined between said driven member and said end wall;

forming a lubricant supply passage providing communication between said gearcase lower cavity and said drive shaft housing upper cavity, and locating said lubricant supply passage such a that its inlet opens into the space between said driven member and said end wall, wherein rotation of said driven member supplies lubricant under pressure to the inlet of said supply passage; and forming a return passage communicating between said drive shaft housing upper cavity and said gearcase lower cavity for providing return flow of lubricant to said gearcase lower cavity.

17. The method of claim 16, wherein the step of forming a lubricant supply passage comprises forming a drive shaft housing supply passge in said drive shaft housing, said drive shaft housing supply passge being in communication with said upper cavity, and forming a gearcase supply passage having an outlet in communication with said drive shaft housing supply passage.

18. The method of claim 17, wherein bearing means is provided in said upper cavity for rotatably supporting said input shaft, and further comprising providing a bearing supply passage in said drive shaft housing having an inlet in communication with said drive shaft housing supply passage and an outlet disposed adjacent said bearing means, and cutting off communication of said drive shaft housing supply passage with said drive shaft housing upper cavity other than by means of said bearing supply passage.

19. The method claim 18, wherein communication of said drive shaft housing supply passage with said upper cavity is cut off by placing a plug toward the upper end of said rive shaft housing supply passage.

20. The method of claim 16, further comprising the step of forming a recess in said lower cavity end wall, and providing the inlet to said lubricant supply passage in said recess.

21. A top cover for a stern drive marine propulsion system including a housing having an upper cavity in which are disposed cooperating gears provided on an input shaft and on the upper end of a drive shaft, said cooperating gears acting to impart rotation to said drive shaft upon rotation of said input shaft, the top cover being adapted for placement on said gearcase, said top cover comprising a one-piece member including a lower surface defining in par the upper extend of said upper cavity, the top cover having a lubricant inlet pocket formed in its lower surface extending upwardly into the top cover, the lubricant inlet pocket defining an upper portion and a lower portion, the lubricant inlet pocket being in communication with said upper cavity, and passage means formed in said top cover extending between the upper portion of said inlet pocket and a recess formed in said top cover lower surface, said top cover recess receiving the upper end of said rive shaft, so that, upon rotation of said cooperating gears, lubricant within said upper cavity is subjected to a pump-like action and supplied to said top cover recess through the lower portion of said lubricant inlet pocket and said passage means, wherein said inlet pocket includes an inner end wall adjacent to which the inlet to said passage mean sis disposed, and said cover further includes an arcuate upwardly ramped wall opposite said inner end wall providing a ramped entrance into the upper portion of said inlet pocket for providing flow of lubricant there into by fluid adhesion.

22. The top cover of claim 21, wherein a portion of said top cover lower surface is adapted for placement onto an upwardly facing surface of said gearcase, and further includes an inner area extending below said lower surface which defines in part the upper wall of said upper cavity, and wherein said pocket extends upwardly into the inner area of said top cover.

23. The top cover of claim 22, wherein said top cover recess id disposed in substantially the central portion of said inner area, and wherein said passage extends substantially laterally through said inner area between the supper portion of said pocket and said top cover recess.

24. In a stern drive marine propulsion system including a housing having an upper cavity in which are disposed cooperating gears provided on an input shaft and on the upper end of a drive shaft, said cooperating gears acting to impart rotation to said drive shaft upon rotation of said input shaft, the improvement comprising a method of improving lubricant circulation, comprising the steps of:

providing a one-piece top cover adapted for placement on said housing for defining in par the upper wall of said upper cavity;

forming a recess in said top cover adapted to receive the upper end of said drive shaft;

forming a lubricant inlet in the portion of said op cover defining in part the upper wall of said upper cavity by forming a pocket extending upwardly into the top cover, the pocket defining an upper portion and a lower portion, wherein lubricant is supplied to the lower portion of said pocket from said supper cavity due to a pump-like action caused by rotation of said cooperating gears;

providing a passage in said top cover extending between the upper portion of said pocket and said top cover recess for supplying lubricant therethrough to said top cover recess; and wherein the step of forming said pocket comprises providing an inner end wall, and wherein said passage is oriented sot hat its inlet is placed adjacent said inner end wall, and wherein said pocket is formed so as to include an upwardly ramped wall opposite said inner end wall providing a ramped entrance into the upper portion of said pocket for accommodating flow of lubricant thereto.

25. The method of claim 24, wherein the top cover includes a downwardly facing surface adapted for placement onto an upwardly facing surface of said gearcase, and further includes an inner area extending below said downwardly facing surface which defines in part the upper wall of said upper cavity, and wherein the step of forming said pocket comprises forming said pocket so as to extend upwardly into the inner area of said top cover.

26. The method of claim 25, wherein said passage is oriented so as to extend substantially laterally through the inner area of said top cover between the upper portion of said pocket and said top cover recess.

* * * * *

UNITED STATES PATENT AND TRADEMARK OFFICE
CERTIFICATE OF CORRECTION

PATENT NO. : 5,236,380
DATED : August 17, 1993
INVENTOR(S) : Niel M. Schueller, et al Page 1 of 2

It is certified that error appears in the above-indentified patent and that said Letters Patent is hereby corrected as shown below:

Column 9, line 2, delete "propelled" and substitute therefor -- propeller --.

Column 9, line 4, delete "dive" and substitute therefor -- drive --.

Column 9, line 53, after "shaft" insert -- housing --.

Column 11, line 1, delete "tis" and substitute therefor -- its --.

Column 11, line 6, delete "rive" and substitute therefor -- drive --.

Column 11, line 19, after "such" delete "a".

Column 11, line 30, delete "passge" and substitute therefor -- passage --.

Column 11, line 31, delete "passge" and substitute therefor -- passage --.

Column 11, line 47, delete "rive" and substitute therefor -- drive --.

UNITED STATES PATENT AND TRADEMARK OFFICE
CERTIFICATE OF CORRECTION

PATENT NO. : 5,236,380
DATED : August 17, 1993
INVENTOR(S) : Niel M. Schueller, et al It is certified that error appears in the above-indentified patent and that said Letters Patent is hereby corrected as shown below:

Column 11, line 68, delete "rive" and substitute therefor -- drive --.

Column 12, line 7, delete "mean sis" and substitute therefor -- means is --.

Column 12, line 20, delete "id" and substitute therefor -- is --.

Column 12, line 23, delete "supper" and substitute therefor -- upper --.

Column 12, line 32, delete "par" and substitute therefor -- part --.

Column 12, line 36, delete "op" and substitute therefor -- top --.

Column 12, line 50, delete "sot hat" and substitute therefor -- so that --.

Signed and Sealed this

Twenty-ninth Day of March, 1994

Attest:

BRUCE LEHMAN

Attesting Officer

Commissioner of Patents and Trademarks